(12) United States Patent
Tijssen et al.

(10) Patent No.: US 10,249,067 B2
(45) Date of Patent: Apr. 2, 2019

(54) CONTROL OF SHAPE INTERACTION IN A USER INTERFACE

(71) Applicant: Adobe Inc., San Jose, CA (US)

(72) Inventors: Remon Tijssen, Mill Valley, CA (US); William T. Ruby, San Mateo, CA (US)

(73) Assignee: Adobe Inc., San Jose, CA (US)

( * ) Notice: Subject to any disclaimer, the term of this patent is extended or adjusted under 35 U.S.C. 154(b) by 341 days.

(21) Appl. No.: 14/663,265

(22) Filed: Mar. 19, 2015

(65) Prior Publication Data
US 2016/0275705 A1    Sep. 22, 2016

(51) Int. Cl.
*G06T 11/20* (2006.01)
*G06F 3/0488* (2013.01)
*G06F 3/0484* (2013.01)

(52) U.S. Cl.
CPC .......... *G06T 11/20* (2013.01); *G06F 3/04845* (2013.01); *G06F 3/04883* (2013.01)

(58) Field of Classification Search
CPC ....... G06T 11/40; G06T 11/203; G06T 17/00; G06T 11/001; G06T 11/00
USPC ......................................................... 345/441
See application file for complete search history.

(56) References Cited

U.S. PATENT DOCUMENTS

| | | | |
|---|---|---|---|
| 8,279,239 B1* | 10/2012 | Jensen | G06T 19/20 345/647 |
| 8,436,821 B1* | 5/2013 | Plichta | G06F 3/04883 345/156 |
| 2011/0074697 A1* | 3/2011 | Rapp | G06F 3/0481 345/173 |
| 2014/0311271 A1* | 10/2014 | Cao | B25J 9/0036 74/490.05 |

* cited by examiner

*Primary Examiner* — Gordon G Liu
(74) *Attorney, Agent, or Firm* — Wolfe-SBMC

(57) ABSTRACT

Techniques to control shape interaction in a user interface are described. In one or more implementations, a method is described of controlling user interface shape interaction by a computing device. A shape is displayed in a user interface by the computing device, the shape described using a plurality of points, each of the points having an associated radius. An input is detected, by the computing device, involving modification of the associated radius of least one of the plurality of points. A determination is made, by the computing device, whether modification of the associated radius of the at least one point causes an intersection of the associated radius of one or more of the plurality of points neighboring the at least one point. Responsive to the determination that the modification causes the intersection, the associated radius of the one or more points are modified such that the intersection does not occur. The shape is displayed by the computing device as having the modified associated radius of the at least one point.

20 Claims, 6 Drawing Sheets

400

402
Display a shape in a user interface by a computing device, the shape described using a plurality of points, each of the points having an associated radius

404
Detecting an input, by the computing device, involving modification of the associated radius of least one of the plurality of points

406
Determine, by the computing device, whether modification of the associated radius of the at least one point causes an intersection of the associated radius of one or more of the plurality of points neighboring the at least one point

408
Responsive to the determination that the modification causes the intersection, modify the associated radius of the one or more neighboring ones of the plurality of points such that the intersection does not occur

410
Display the shape by the computing device as having the modified associated radius of the at least one point

Fig. 4

500

502
Display a shape in a user interface by a computing device, the shape described using a plurality of points, each of the points defined using a two-dimensional position and an associated radius

504
Detect an input, by the computing device, specifying an amount of movement of at least one of the plurality of points

506
Responsive to the detection:

508
Adjust the associated radius of the at least one point to exhibit the amount of movement

510
Adjust the associated radius of one or more other points of the plurality of points that are proximal to the at least one point to exhibit movement that is less than the amount of movement of the at least one point

512
Display an adjusted version of the shape in the user interface by the computing device in which the at least one point exhibits the amount of movement and the one or more other points exhibit the movement that is less than the amount of movement of the movement of the at least one point

*Fig. 5*

CONTROL OF SHAPE INTERACTION IN A USER INTERFACE

BACKGROUND

Techniques have been developed to support user interaction with shapes in a user interface. These techniques support creation of a shape in an image, specify selection of an object within an image, perform a cropping operation, and so forth. Conventional techniques that are utilized to support this interaction, however, often lack intuitiveness and are not natural to a casual user, thereby resulting in user frustration and inefficiencies.

For example, conventional techniques to manipulate vector shapes are performed using vector points and handles, aka Bezier paths. Thus, this interaction is not performed with the vector shape itself in these conventional techniques, but rather with vector points and handles that are positioned away from the shape outline in order to make a change to the shape. Consequently, casual users are typically forced to guess how to input a change by making guesses as to which vector points and handles provide a desired effect, thereby resulting in an arduous trial-and-error process to achieve a desired result.

SUMMARY

Techniques to control shape interaction in a user interface are described. In one or more implementations, a method is described of controlling user interface shape interaction by a computing device. A shape is displayed in a user interface by the computing device, the shape described using a plurality of points, each of the points having an associated radius. An input is detected, by the computing device, involving modification of the associated radius of least one of the plurality of points. A determination is made, by the computing device, whether modification of the associated radius of the at least one point causes an intersection of the associated radius of one or more of the plurality of points neighboring the at least one point. Responsive to the determination that the modification causes the intersection, the associated radius of the one or more points are modified such that the intersection does not occur. The shape is displayed by the computing device as having the modified associated radius of the at least one point.

In one or more implementations, a method is described of controlling user interface shape interaction by a computing device. A shape is displayed in a user interface by the computing device, the shape described using a plurality of points, each of the points defined using a two-dimensional position and an associated radius. An input is detected, by the computing device, specifying an amount of movement of at least one of the plurality of points. Responsive to the detection, adjustments are made to the associated radius of the at least one point to exhibit the amount of movement and one or more other points of the plurality of points that are proximal to the at least one point to exhibit movement that is less than the amount of movement of the at least one point. An adjusted version of the shape is displayed in the user interface by the computing device in which the at least one point exhibits the amount of movement and the one or more other points exhibit the movement that is less than the amount of movement of the movement of the at least one point.

In one or more implementations, a system includes a user interface control module implemented at least partially in hardware and configured to display a shape in a user interface, the shape defined using a plurality of points, each of the points defined using a two-dimensional position and an associated radius and detect an input involving modification of the associated radius of at least one of the plurality of points. The system also includes a shape manipulation module implemented at least partially in hardware and configured to manipulate the shape based on physical rules involving determination whether modification of the associated radius of the at least one point causes an intersection of the associated radius of one or more of the plurality of points neighboring the at least one point and responsive to the determination that the modification causes the intersection, modify the associated radius of the one or more points such that the intersection does not occur.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is a flow diagram depicting a procedure is described in an example implementation of controlling user interface shape interaction by a computing device.

FIG. 5 is a flow diagram depicting another procedure is described in an example implementation of controlling user interface shape interaction by a computing device.

DETAILED DESCRIPTION

Overview

Conventional techniques used to support shape interaction by a user lack intuitiveness and are difficult to learn by casual users. As such, these users are typically forced to engage in a lengthy trial-and-error process to achieve a desired result, which is frustrating and inefficient.

Techniques involving control of shape interaction in a user interface are described. In one or more implementations, a shape is defined using a plurality of points that define corners of the shape. Each of the points has an associated radius that is used to specify a final output form of the shape. For example, the points may define four corners of the shape and the associated radius of these points is usable to provide a corner-rounding effect. Therefore, an output form of the shape includes rounded corners in this example, with a data model maintained by a computing device using the corners and the radii.

User interaction with the shape, such as to modify an output form of the shape, is controlled using this data model. A user, for instance, may use direct manipulation with real time feedback to change a corner of the square example above inward. This movement causes an increase in a radius of the shape associated with a point at this corner thereby giving the corner a rounded shape.

Additionally, the computing device is configured to perform this modification following physical rules, such as to modify a border of the shape in a manner similar to a modification made to a string. For example, the computing device is configured to determine when the associated radius of the point (e.g., corner) being moved intersects one or more other points (e.g., corners) of the shape. In response, the associated radius of the point being intersected is also modified, such as to prevent overlap or conflict. In this way, the radius of the intersected point follows modifications made to the radius of the selected point, thereby supporting natural and intuitive controls that are performed through direct interaction with the point and therefore the shape itself. Further description of these and other examples is discussed in the following sections.

In the following discussion, an example environment is first described that may employ the shape interaction control techniques described herein. Example procedures are then described which may be performed in the example environment as well as other environments. Consequently, performance of the example procedures is not limited to the example environment and the example environment is not limited to performance of the example procedures.

Example Environment

Figure 1:
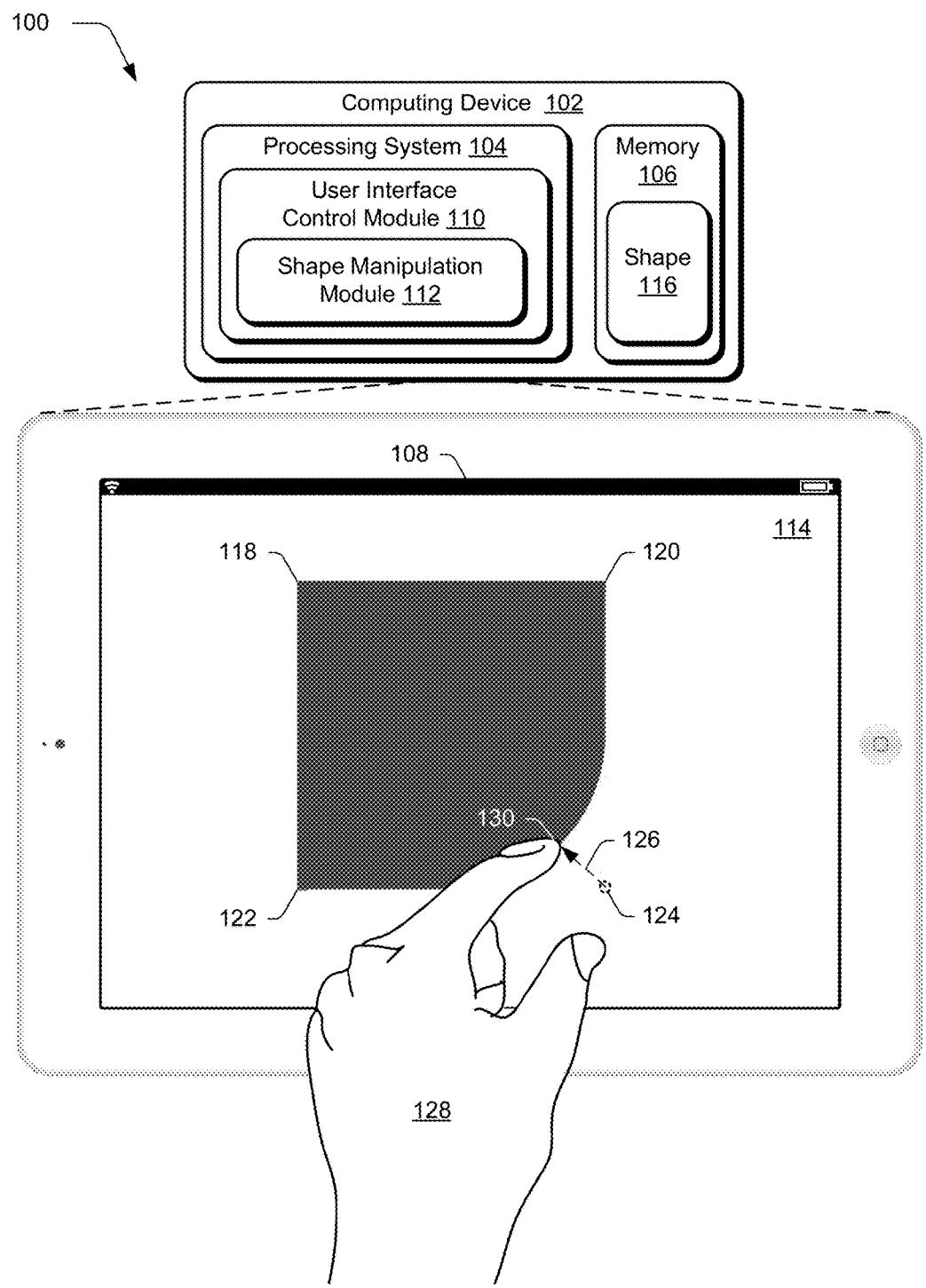
FIG. 1 is an illustration of an environment in an example implementation that is operable to employ shape interaction control techniques described herein.

FIG. 1 is an illustration of an environment 100 in an example implementation that is operable to employ shape interaction control techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 6.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth.

The processing system 104 is illustrated as executing a user interface control module 110 and a shape manipulation module 112 both of which are storable in the memory 106 and as such are implemented at least partially in hardware. The user interface control module 110 and shape manipulation module 112 are executable by the processing system 104 to cause performance of one or more operations. Other implementations are also contemplated, such as implementation as dedicated hardware components, e.g., application specific integrated circuit, fixed-logic circuitry, and so forth.

The user interface control module 110 is representative of functionality of the computing device 102 to generate and manage interaction with a user interface 114 displayed by the display device 108. For example, a user may use a keyboard, cursor control device, gesture detected by touchscreen functionality of the display device 108, verbal utterance, and so on to interact with shape 116, which is illustrated as stored in memory 106 and is displayed by the display device 108.

The shape 116 can assume a variety of different forms, such as objects having corners that are defined in as part of a data model through points defined in two-dimensional space and an associated radius. As illustrated, for instance, the shape 116 is a square in this example that is specified by first, second, third, and fourth points 118, 120, 122, 124 that define corners of the square. The first, second, and third points 118, 120, 122 correspond to a final output version of the shape 116 as displayed in the user interface 114.

The fourth point 124, however, is illustrated in phantom because a final drawn output of the shape 114 as illustrated in the user interface 114 is not displayed at that point. Rather, an input 126 is detected (e.g., a single-finger gesture made by a user's hand 128) by the computing device 102 as involving movement from a defined location of the fourth point 124 to a new location 130. In response, the objection manipulate module 112 adjusts an associated radius of the fourth point 124, which is exhibited as a rounded corner in the user interface 114. A variety of other inputs may also be detected as previously described, such as through use of a cursor control device, spoken utterance, and so forth.

Thus, in this example the shape manipulation module 112 is configured to employ physical rules regarding interaction with the shape 116 to manipulate a drawn output of the shape 116. Additionally, this interaction and associated modifications are made in relation to a data model of the shape 116 that is maintained by the object manipulate module 112. In this way, the data model of the shape itself is not altered and as such, modifications made through interaction by a user may also be removed by the user to return the shape to an original output form, thereby promoting predictability of user interaction.

In the illustrated example, the finger of the user's hand 128 may input an amount of movement in an opposite direction to the previous input 126 that caused the rounded corner. As the input 126 is used to define a change to the radius, reversing the input may be used to remove this change to the radius, thereby causing the shape manipulation module 112 to draw the shape 116 at the fourth point 124. Further discussion of shape manipulation is described in the following and shown in corresponding figures.

Figure 2:
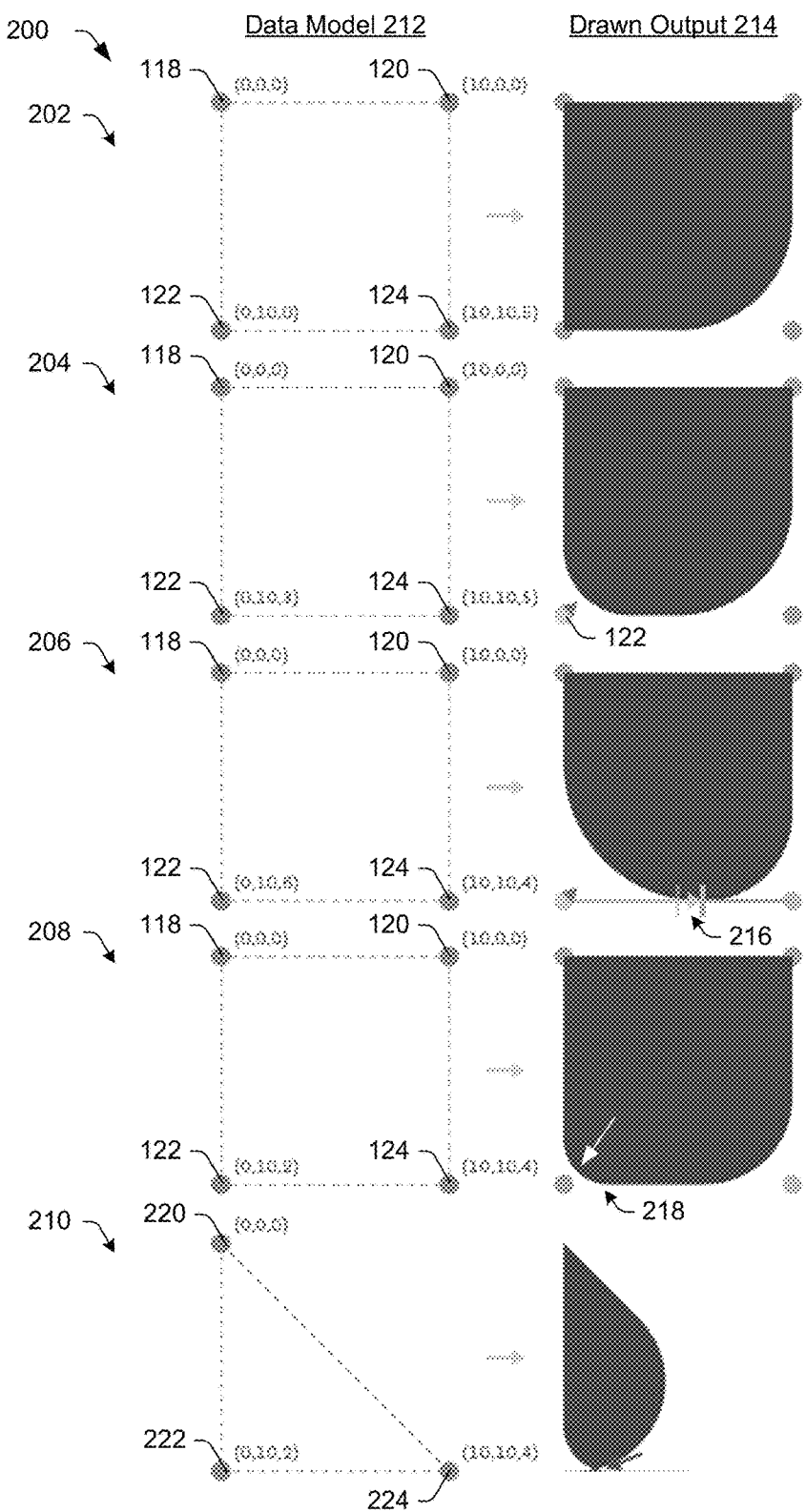
FIG. 2 depicts a system in an example implementation of control of shape interaction of a shape of FIG. 1 by a shape manipulation module in greater detail.

FIG. 2 depicts a system 200 in an example implementation of control of shape interaction of the shape 116 of FIG. 1 by a shape manipulation module 112 in greater detail. This system 200 is illustrated using first, second, third, fourth, and fifth stages 202, 204, 206, 208, 210 and associated data models 212 and drawn output 214 columns indicating how the shape 116 is maintained in memory 106 and displayed in the user interface 114, respectively.

At the first stage 202, the shape 116 of FIG. 1 is shown. The shape is drawn based on the first, second, third, and fourth 118, 120, 122, 124 points. Each of the points are specified by a two-dimensional position and an associated radius as "(x,y,r)" in the illustration. For example, the first point 118 has an x/y location of "0,0" and an associated radius of zero. The second point 120 has an x/y location of "10,0" and an associated radius of zero and the third point 122 has an x/y location of "0,10" and an associated radius of zero.

The fourth point 124, however, has an associated radius of five, which causes a rounded output as shown in the drawn output 214. Thus, setting the associated radius of zero for the first, second, and third points 118, 120, 122 causes straight lines to be drawn between the first and second points 118, 120, and the first and third points 118, 122. The associated radius of the fourth point 124, however, causes a curvature in the lines between the second, third, and fourth points 120, 122, 124 as illustrated.

At the second stage 204, assuming the associated radii do not overlap neighboring/proximal points, modifications may be made freely to the points and have those modifications affect those points, solely. In the illustrated example, a movement is detected cause an adjustment of an associated radius of the third point 122 from zero of the first stage 202 to three in the second stage 204. As illustrated, this modification does not affect the radii of the first, second, or fourth points 118, 120, 124.

At the third stage 206, however, an adjustment to the associated radius of the third point 122 continues from the second stage 204 and is set at a value of six, which causes an overlap 216 with a radius of neighboring fourth point 124. In response to determination that this overlap is to occur, the shape manipulation module 112 adjust the radius of the fourth point 124, e.g., from five to four in this example. In this way, movement of the third point 122 through adjustment of the radius "pushes out" conflicting radii, thereby maintaining the radius of a point with which a user a currently interacting.

At the fourth stage 208, the adjusted "pushed out" radius of the fourth point 124 remains the same, even if the radius of the third point 122 is adjusted 218 as indicated by the arrow (e.g., moved back in an opposite direction as described above) such that there is no longer a conflict. Other examples are also contemplated in which the radius of the fourth point 124 returns back to a previously defined value.

These techniques are equally applicable to shapes 116 other than squares. As shown at the fifth stage 210, for instance, the shape is specified as a triangle using first, second, and third points 220, 222, 224. In this example, use of the radius as a distance along a corresponding side between two points that are adjacent is not used to determine intersection of the associated radii. Accordingly, a variety of other techniques are usable to perform this determination, an example of which is described as follows and shown in a corresponding figure.

Figure 3:
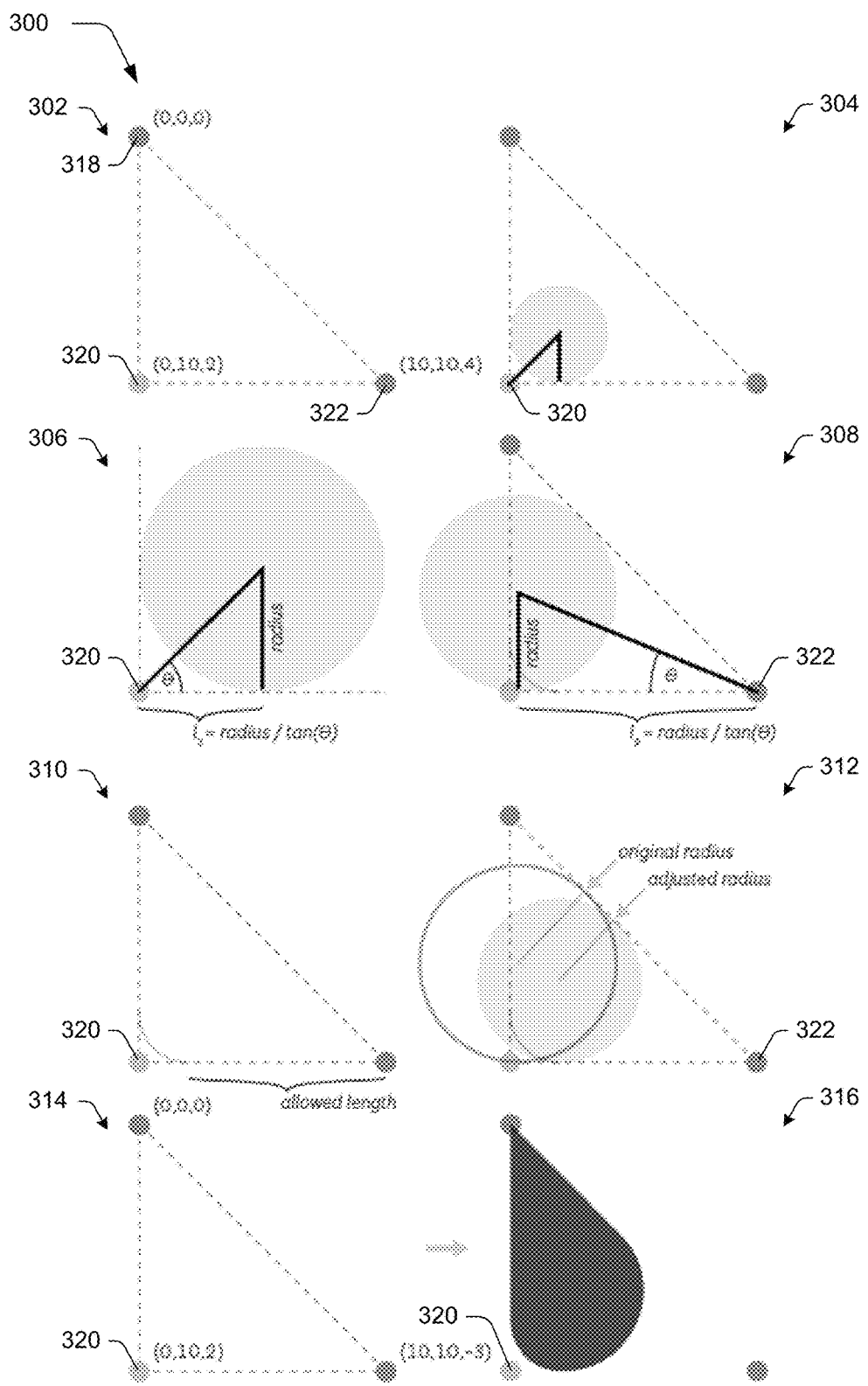
FIG. 3 depicts a system in an example implementation in which a determination of whether associated radii of points of a shape are intersected is shown.

FIG. 3 depicts a system 300 in an example implementation in which a determination of whether associated radii of points of a shape 116 intersect by the shape manipulation module 112 in shown. This system is also shown using a plurality of stages, including first through eight 302-316 stages.

In order to determine an intersection in this example in which the shape 116 is a triangle having first, second, and third points 318, 320, 322 as shown at the first stage 302, the shape manipulation module 112 calculates a length of polygons for each side taken up by a circle with a given radius. This begins by first taking a distance between two points in question, e.g., the second and third points 320, 322.

At the second stage 302, an angle of a corner at the second point 320 is calculated by the shape manipulation module 112. In another example, a total angle of corner constructs of the second and third points 320, 322 is calculated and divided by half.

As the circle will always meet the two legs of the polygon at a right angle, the shape manipulation module 112 constructs a right triangle, and uses the radius to calculate how much of the side length the rounded corner consumes as shown at the third and fourth stages 306, 308. The shape manipulation module 112 then compares the sum of those lengths with a length of the side (e.g., the line connecting the second and third points 320, 322) as shown at the fifth stage 310 to determine if this sum is less than or equal to the length of the side. If so, associated radii of neighboring points, e.g., point 322 in this example, are not intersected and thus unaffected as described earlier.

However, in an instance in which such an intersection is to occur, the shape manipulation module 112 adjusts the associated radius of the neighboring point (e.g., the third point 322) to "push out" the radii as described earlier. Thus, in this example the point that is being actively changed and its corresponding effect of adjust of the associated radius is protected.

In order to do so, the shape adjustment module 112 proceeds backwards through the previous steps with the side length remaining after setting the active point's radius (e.g., the second point 320) to calculate a valid radius for the affected neighboring point, e.g., the third point 320, as shown at the fifth, sixth, and seventh stages 310, 312, 314, a drawn output result of which is shown at the eighth stage 316.

These steps are performed for each point that neighbors the second point 320, e.g., the first and third points 318, 322 that are joined and form line with the second point 320. In pseudo code, this is represented as follows, in which the point of interaction is labeled as "1." For brevity, calculation of the total angle of each corner is omitted, and an assumption is made that it has been halved as noted above.

total length of side=distance(point$_1$,point$_2$)

$l_1$=radius$_1$/tan($\theta_1$)

$l_2$=radius$_2$/tan($\theta_2$)

If $l_1$+$l_2$>total length of side allowed length=total length of side−$l_2$ radius$_2$=allowed length×tan($\theta_2$)

This process is repeated by the shape adjustment module 112 for each neighboring point. In the event that the sides are not the same length, the point with which interaction is currently occurs is limited by the shape adjustment module 112 so as not to exceed the smaller distance of the adjacent points, and otherwise the operation proceeds as above. Further discussion of these and other examples is described in relation to the following procedures.

Example Procedures

The following discussion describes shape interaction control techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-3.

FIG. 4 depicts a procedure 400 in an example implementation of controlling user interface shape interaction by a computing device. A shape is displayed in a user interface by the computing device, the shape described using a plurality of points, each of the points having an associated radius (block 402).

An input is detected, by the computing device, involving modification of the associated radius of least one of the plurality of points (block 404). The input, for example, may involve direct interaction with a point of the shape to move the point to a desired location, such as via a gesture, use of a cursor control device, and so on. In response, the shape manipulation module 112 modifies an associated radius of the point such that the point and corresponding boundary of the shape is drawn at that location.

A determination is made, by the computing device, whether modification of the associated radius of the at least one point causes an intersection of the associated radius of one or more of the plurality of points neighboring the at least one point (block 406). As shown at the third stage 206 of FIG. 2, for instance, an associated radius of the third point 122 intersects a radius of the fourth point 124 as unmodified in the second stage 204, e.g., has a value of five.

Responsive to the determination that the modification causes the intersection, the associated radius of the one or more points are modified such that the intersection does not occur (block 408). Continuing with the previous example, the radius of the fourth point 124 is lowered from a value of five to a value of four such that the intersection will not occur. The shape is then displayed by the computing device as having the modified associated radius of the at least one point (block 410), an example of which is shown in the fifth stage 210 of FIG. 2. Although points as defining corners of the shape and interaction therewith has been described, points defining parts of a border of a shape that are not considered corners are also contemplated, e.g., such that the border of the shape is definable at each location using a point, to which, the techniques described herein are applied to adjust radii or neighboring points.

FIG. 5 depicts another procedure 500 in an example implementation in which of controlling user interface shape interaction by a computing device. A shape is displayed in a user interface by the computing device, the shape described using a plurality of points, each of the points defined using a two-dimensional position and an associated radius (block 502). As shown in FIGS. 2 and 3, for instance, each point defining a corner of the shape is described using an x/y coordinate and an associated radius.

An input is detected, by the computing device, specifying an amount of movement of at least one of the plurality of points (block 504). As shown in FIG. 1, movement from an original location of the fourth point 124 to new location 130 is shown which is defined through use of a gesture although other examples are also contemplated.

Responsive to the detection (block 506), adjustments are made to the associated radius of the at least one point to exhibit the amount of movement (block 508) and one or more other points of the plurality of points that are proximal to the at least one point to exhibit movement that is less than the amount of movement of the at least one point (block 510). In this example, points that are next to the fourth point 124 being modified are changed to follow the defined radius along the sides. Additionally, if this movement continues such that an intersection would occur, radii of neighboring second and third points 120, 122 may also be adjust as described in relation to FIG. 2. An adjusted version of the shape is then displayed in the user interface by the computing device in which the at least one point exhibits the amount of movement and the one or more other points exhibit the movement that is less than the amount of movement of the movement of the at least one point (block 512). A variety of other examples are also contemplated as described above.

Example System and Device

Figure 6:
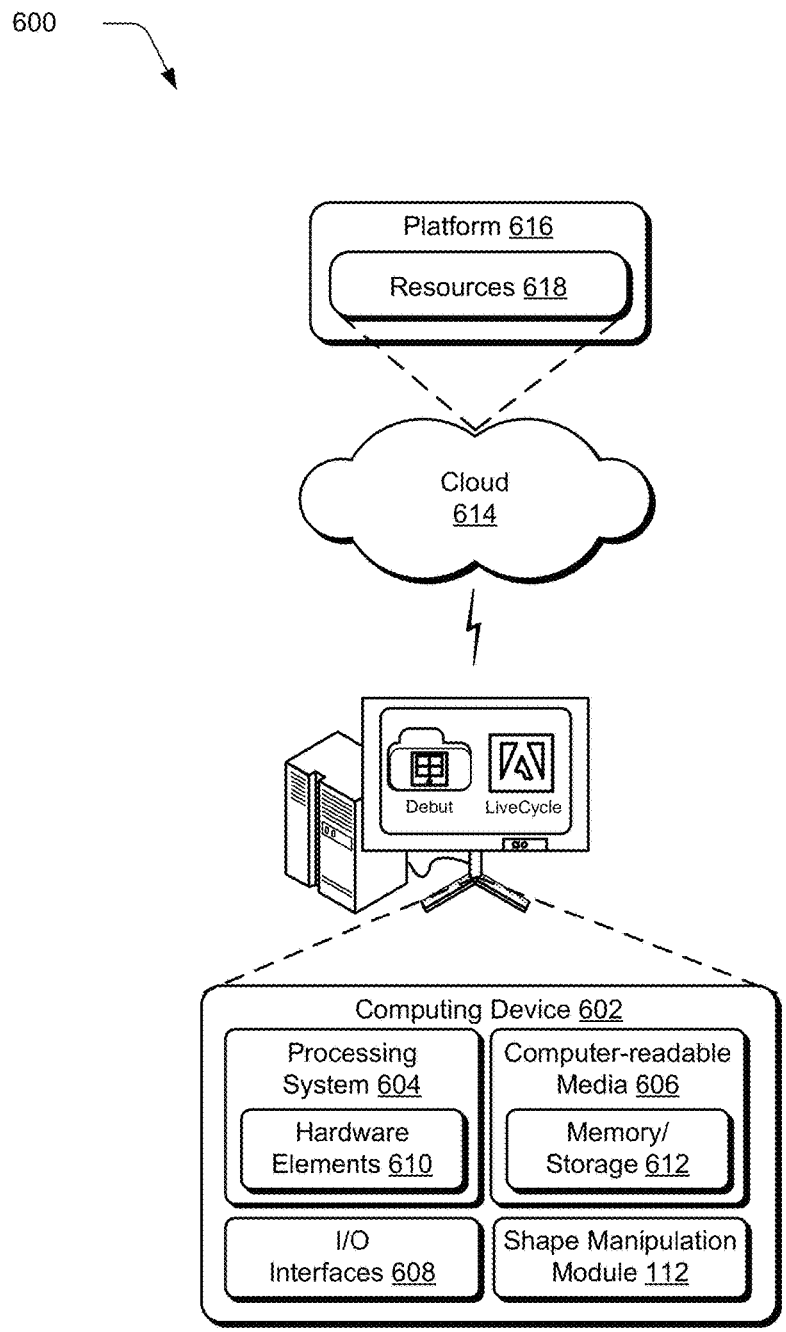
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the shape manipulation module 112. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method of controlling user interface shape interaction by a computing device, the method comprising:
    displaying, by the computing device, a shape in a graphical user interface, the shape described using a plurality of points, each of the points having an associated radius;
    detecting, by the computing device, an input involving modification of the associated radius of one point of the plurality of points;
    determining, by the computing device, whether the modification of the associated radius of the one point causes an intersection of the associated radius of at least one other point of the plurality of points neighboring the one point;
    responsive to the determining that the modification causes the intersection, modifying, by the computing device, the associated radius of the at least one other point of the plurality of points neighboring the one point such that the associated radius of the one point is maintained and intersection does not occur; and
    displaying, by the computing device, the shape as having the modified associated radius of the one point.

2. A method as described in claim 1, wherein the plurality of points define respective corners of the shape that are joined, one to another, with straight lines.

3. A method as described in claim 1, wherein the input involves direct manipulation of the one point of the plurality of points.

4. A method as described in claim 3, wherein the input is detected as a gesture.

5. A method as described in claim 1, wherein the shape is a single line having a beginning and an end that are not self-joining.

6. A method as described in claim 1, wherein the modifying of the associated radius of the at least one other point points is configured to prevents overlap or conflict.

7. A method as described in claim 1, wherein the plurality of points define a Bezier curve.

8. A method of controlling user interface shape interaction by a computing device, the method comprising:
    displaying, by the computing device, a shape in a graphical user interface, the shape described using a plurality of points, each point of the plurality of points defined using a two-dimensional position and an associated radius;
    detecting, by the computing device, an input specifying an amount of movement of one point of the plurality of points, the input involving direct interaction with the one point;
    responsive to the detecting, adjusting, by the computing device, the associated radius of:
        the one point to exhibit the amount of movement; and
        at least one other point of the plurality of points proximal to the one point to exhibit an amount of movement that is less than the amount of movement of the one point; and
    displaying, by the computing device, an adjusted version of the shape in the user interface in which the one point exhibits the amount of movement and the at least one other point exhibits the amount of movement that is less than the amount of the movement of the one point.

9. A method as described in claim 8, wherein the plurality of points define respective corners of the shape that are joined, one to another, with straight lines.

10. A method as described in claim 8, wherein the shape is a single line having a beginning and an end that are not self-joining.

11. A method as described in claim 8, wherein increasing the amount of movement of the one point causes an increase in a number of other points of the plurality of points that are adjusted.

12. A method as described in claim 8, wherein the plurality of points define a Bezier curve.

13. A method as described in claim 8, wherein the adjusting of the associated radius of the at least one other point proximal to the one point prevents overlap or conflict.

14. A method as described in claim 8, further comprising:
    detecting, by the computing device, a second input specifying an amount of movement of the one point opposite the amount of movement specified by the previously detected input; and
    responsive to the detecting the second input removing the adjustment to the associated radius of:
        the one point such that the one point no longer exhibits the amount of movement; and
        the at least one other point of the plurality of points proximal to the one point such that the at least one other point of the plurality of points proximal to the one point no longer exhibits the movement that is less than the amount of the movement of the one point.

15. A method as described in claim 14, further comprising displaying, by the computing device, the shape in the graphical user interface as having the removed adjustments to the associated radiuses.

16. A method as described in claim 8, wherein the displaying of the adjusted version of the shape follows physical rules of interaction with a shape in a manner such as pushing or pulling a string having the shape that includes the one point and the at least one other point of the plurality of points.

17. A system comprising:
    a user interface control module implemented at least partially in hardware and configured to:
        display a shape in a graphical user interface, the shape defined using a plurality of points, each of the points defined using a two-dimensional position and an associated radius; and
        detect an input involving modification of the associated radius of one point of the plurality of points, the input performed through direct interaction with the one point; and
    a shape manipulation module implemented at least partially in hardware and configured to manipulate the shape based on physical rules involving:
        a determination whether the modification of the associated radius of the one point causes an intersection of the associated radius of at least one other point of the plurality of points neighboring the one point; and
        responsive to the determination that the modification causes the intersection, modify the associated radius of the at least one other point of the plurality of points neighboring the one point such that the intersection does not occur.

18. A system as described in claim 17, wherein the plurality of points define respective corners of the shape that are joined, one to another.

19. A system as described in claim 17, wherein said modifying the associated radius of the at least one other point of the plurality of points neighboring the one point maintains the associated radius of the one point.

20. A system as described in claim 17, wherein the user interface control module is further configured to:
    display the shape in the graphical user interface as having the modified associated radius of the one point.

* * * * *